United States Patent
Noh

(10) Patent No.: US 11,904,845 B2
(45) Date of Patent: Feb. 20, 2024

(54) APPARATUS FOR CONTROLLING AUTONOMOUS PARKING AND METHOD THEREOF

(71) Applicant: HL KLEMOVE CORP., Incheon (KR)

(72) Inventor: Tae Bong Noh, Gyeonggi-do (KR)

(73) Assignee: HL KLEMOVE CORP., Incheon (KR)

(*) Notice: Subject to any disclaimer, the term of this patent is extended or adjusted under 35 U.S.C. 154(b) by 0 days.

(21) Appl. No.: 17/722,368

(22) Filed: Apr. 17, 2022

(65) Prior Publication Data
US 2022/0340125 A1    Oct. 27, 2022

(30) Foreign Application Priority Data

Apr. 27, 2021 (KR) .................. 10-2021-0054203

(51) Int. Cl.
*B60W 30/06*    (2006.01)
*B60W 40/09*    (2012.01)
*G08G 1/14*    (2006.01)

(52) U.S. Cl.
CPC ............ *B60W 30/06* (2013.01); *G08G 1/146* (2013.01); *G08G 1/148* (2013.01); *B60W 40/09* (2013.01); *B60W 2540/30* (2013.01)

(58) Field of Classification Search
None
See application file for complete search history.

(56) References Cited

U.S. PATENT DOCUMENTS

| | | | |
|---|---|---|---|
| 2005/0049766 A1* | 3/2005 | Tanaka | B62D 15/0285 348/148 |
| 2020/0005649 A1* | 1/2020 | Kim | B60Q 9/005 |
| 2020/0384984 A1* | 12/2020 | Murray | B60W 50/14 |

* cited by examiner

*Primary Examiner* — John F Mortell
(74) *Attorney, Agent, or Firm* — Ladas & Parry, LLP

(57) ABSTRACT

An apparatus for controlling autonomous parking and method thereof are provided. The apparatus for controlling autonomous parking according to an exemplary embodiment of the present disclosure a sensor unit for acquiring information around a host vehicle, a storage for storing driver's tendency information upon autonomous parking, and a controller communicatively connected to the sensor unit. Here, the controller is configured to: search for an available parking space based on the acquired information around the vehicle, determine whether the available parking space is next to a pillar, determine whether a passenger exists on the side of the pillar when parking in the available parking space, set a parking target position based on the driver's tendency information when the passenger gets off and set a parking longitudinal offset so that a door and a side mirror of the vehicle do not interfere with the pillar, and perform autonomous parking by varying the parking target position according to the offset set above.

16 Claims, 4 Drawing Sheets

APPARATUS FOR CONTROLLING AUTONOMOUS PARKING AND METHOD THEREOF

CROSS-REFERENCE TO RELATED APPLICATION

This application claims priority to and the benefit of Korean Patent Application No. 10-2021-0054203, filed on Apr. 27, 2021, the disclosure of which is incorporated herein by reference in its entirety.

TECHNICAL FIELD

The present disclosure relates to an apparatus for controlling autonomous parking and method thereof.

BACKGROUND

Recently, ADAS (Advanced Driver Assistance Systems) has been integrated into almost all vehicles to assist the driver while driving. ADAS enables smooth and safe driving or convenient and safe parking experiences by adapting, automating and improving vehicle systems. In particular, autonomous parking technology is a trend that is widely used in vehicle applications as a convenience function with a high level of driver's perception.

Meanwhile, many people have a high preference for parking in a parking space next to a pillar due to the narrow parking space. For example, there are many cases where the door of the vehicle collides with an adjacent vehicle, so-called door ding, when getting on and off after parking, or parking close to a pillar for the convenience of getting on and off.

However, in this case, a limited opening and closing amount of the door or a collision of the side mirror with the pillar often occurs depending on a position of the pillar with respect to the vehicle, causing inconvenience to the passenger when the passenger gets on and off the vehicle or causing economic loss due to damage to the door or the side mirror.

The above information disclosed in this Background section is only for enhancement of understanding of the background of the disclosure and it may therefore contain information that does not form the prior art that is already known to a person of ordinary skill in the art.

SUMMARY

Technical Problem

An embodiment of the present disclosure is directed to providing an apparatus for controlling autonomous parking and method thereof capable of preventing interference between a door and a side mirror and a pillar when a passenger gets on and off when autonomous parking adjacent to a pillar.

The technical problems to be solved in the present disclosure are not limited to the technical problems mentioned above, and other technical problems not mentioned will be clearly understood by those of ordinary skill in the art from the following description.

Technical Solution

According to an aspect of the present disclosure, provided is an apparatus for controlling autonomous parking, including: a sensor unit for acquiring information around a host vehicle; a storage for storing driver's tendency information upon autonomous parking; and a controller communicatively connected to the sensor unit and the storage and configured to: search for an available parking space based on the acquired information around the vehicle, determine whether the available parking space is next to a pillar, determine whether a passenger exists on the side of the pillar when parking in the available parking space, set a parking target position based on the driver's tendency information when the passenger gets off and set a parking longitudinal offset so that a door and a side mirror of the vehicle do not interfere with the pillar, and perform autonomous parking by varying the parking target position according to the offset set above.

In an embodiment, the apparatus for controlling autonomous parking may further include an input unit to which the driver's tendency information is input. Here, the driver's tendency information may include information on at least one of whether a pillar is adjacent when parking next to the pillar, a minimum door opening and closing amount when a passenger gets on and off, and whether to use remote input/output when parking near a pillar.

In an embodiment, the controller may be configured to search for a position of a pillar and a position of a stopper in the parking space, and search for seating information of a driver and fellow passengers.

In an embodiment, the controller may set the parking target position in consideration of the central alignment or standard separation distance between the vehicle and the pillar or other vehicle with respect to the longitudinal direction of the vehicle so that the vehicle enters a standard length or more based on a parking line with respect to the lateral direction of the vehicle or a wheel approaches a stopper if the stopper exists.

In an embodiment, the controller may be configured to: set a door offset if the door and the pillar interfere with each other when parking in the available parking space, set a side mirror offset if the side mirror and the pillar interfere with each other when parking at a parking target position reflecting the door offset, and set a parking target position reflecting the side mirror offset.

In an embodiment, the controller may be configured to reset the offset if the driver selects to perform remote entry/exit of the vehicle.

In an embodiment, the sensor unit may include a radar sensor for acquiring a position and a distance to an object around the vehicle and an image sensor for acquiring images around the vehicle.

According to an aspect of the present disclosure, provided is a method for controlling autonomous parking, including: inputting, by an input unit, driver's tendency information upon automatic parking; searching for, by a controller, an available parking space based on information around a host vehicle acquired by a sensor unit; determining, by the controller, whether the available parking space is next to a pillar; determining, by the controller, whether a passenger exists on the side of the pillar when parking in the available parking space; setting, by the controller, a parking target position based on the driver's tendency information when the passenger gets off and setting a parking longitudinal offset so that a door and a side mirror of the vehicle do not interfere with the pillar; and performing, by the controller, autonomous parking by varying the parking target position according to the offset set above.

In an embodiment, the inputting may input information on at least one of whether a pillar is adjacent when parking next to the pillar, a minimum door opening and closing amount when a passenger gets on and off, and whether to use remote input/output when parking near a pillar.

In an embodiment, the searching for may search for a position of a pillar and a position of a stopper in the parking space, and search for seating information of a driver and fellow passengers.

In an embodiment, the setting may set the parking target position in consideration of the central alignment or standard separation distance between the vehicle and the pillar or other vehicle with respect to the longitudinal direction of the vehicle so that the vehicle enters a standard length or more based on a parking line with respect to the lateral direction of the vehicle or a wheel approaches a stopper if the stopper exists.

In an embodiment, the setting may include setting a door offset so that the door and the pillar do not interfere with each other if the door and the pillar interfere with each other when parking in the available parking space; setting a side mirror offset so that the side mirror and the pillar do not interfere with each other if the side mirror and the pillar interfere with each other when parking at a parking target position reflecting the door offset; and setting a parking target position reflecting the side mirror offset.

In an embodiment, the performing may reset the offset if the driver selects to perform remote entry/exit of the vehicle.

Advantageous Effects

The apparatus for controlling autonomous parking and method thereof according to an exemplary embodiment of the present disclosure can prevent interference between the door and the side mirror and the pillar when passengers are getting on and off, so that the driver's convenience can be improved, by setting the target parking position in consideration of the parking longitudinal offset so that the pillar and the door and the side mirror do not interfere with each other, at the same time while considering the driver's tendency when parking adjacent to the pillar.

In addition, the apparatus for controlling autonomous parking and method thereof according to an exemplary embodiment of the present disclosure can prevent damage to the door and the side mirror, thereby suppressing economic loss or time loss by setting a parking longitudinal offset to prevent interference between a door and a side mirror and a pillar.

BRIEF DESCRIPTION OF THE DRAWINGS

The above and other aspects, features, and advantages of the present disclosure will become more apparent to those of ordinary skill in the art by describing embodiments thereof in detail with reference to the accompanying drawings, in which.

DETAILED DESCRIPTION OF THE EMBODIMENTS

Figure 1:
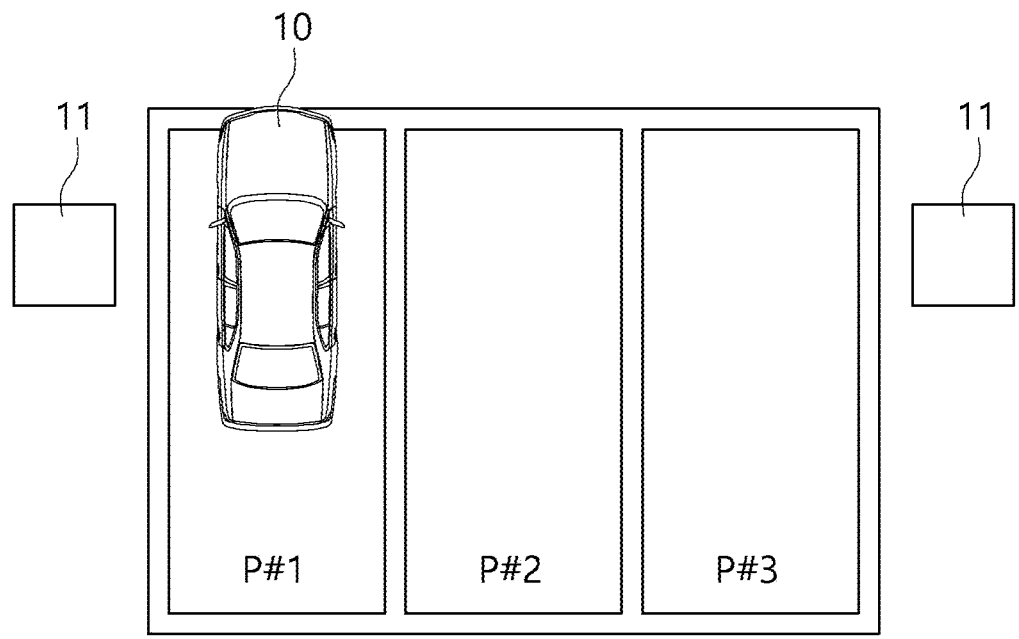
FIG. 1 is an exemplary view showing a state in which a vehicle equipped with an apparatus for controlling autonomous parking according to an exemplary embodiment of the present disclosure is parked.

Hereinafter, exemplary embodiments of the present disclosure will be described in detail so that those of ordinary skill in the art can readily implement the present disclosure with reference to the accompanying drawings. The present disclosure may be embodied in many different forms and are not limited to the embodiments set forth herein. In the drawings, parts unrelated to the description are omitted for clarity of description of the present disclosure. Throughout the specification, like reference numerals denote like elements.

Embodiments of the present disclosure are provided to describe the present disclosure more fully to those skilled in the art, the embodiments described below can be modified into various other forms, and the scope of the present disclosure is not limited to the following embodiments. Rather, these embodiments make the present disclosure more meaningful and complete and are provided for fully conveying the concept of the present disclosure to those of ordinary skill in the art.

The terminologies used herein are for the purpose of describing particular embodiments only and are not intended to be limiting to the present disclosure. As used herein, the singular forms are intended to include the plural forms as well, unless the context clearly indicates otherwise. In addition, the terms "comprise" and/or "comprising," when used in this specification, specify the presence of stated features, integers, steps, operations, members, components and/or a group thereof but do not preclude the presence or addition of one or more other features, integers, steps, operations, members, components, and/or groups thereof. As used herein, the term "and/or" includes any one of and all combinations of one or more of the relevant listed items.

Although the terms "first," "second," etc. are used herein to describe various members, regions and/or parts, it is apparent that these members, components, regions, layers and/or parts are not limited by these terms. These terms do not imply any particular order, top, bottom, or superiority and are used only to distinguish one member, region, or part from another member, region, or part. Thus, the first member, the first region, or the first part described below may refer to the second member, the second region, or the second part without departing from the teachings of the present invention.

In this specification, terms such as "or" and "at least one" may represent one of the words listed together or a combination of two or more. For example, "A or B" and "at least one of A and B" may include only one of A or B, or may also include both A and B.

Hereinafter, the embodiments of the present disclosure are described with reference to the drawings schematically illustrating the embodiments of the present disclosure. In the drawings, for example, variations in the illustrated shape may be expected depending on manufacturing techniques and/or tolerances. Accordingly, the embodiments of the present disclosure should not be construed as being limited to any particular shape of the regions illustrated herein and should include, for example, variations in shape resulting from manufacturing.

Figure 2:
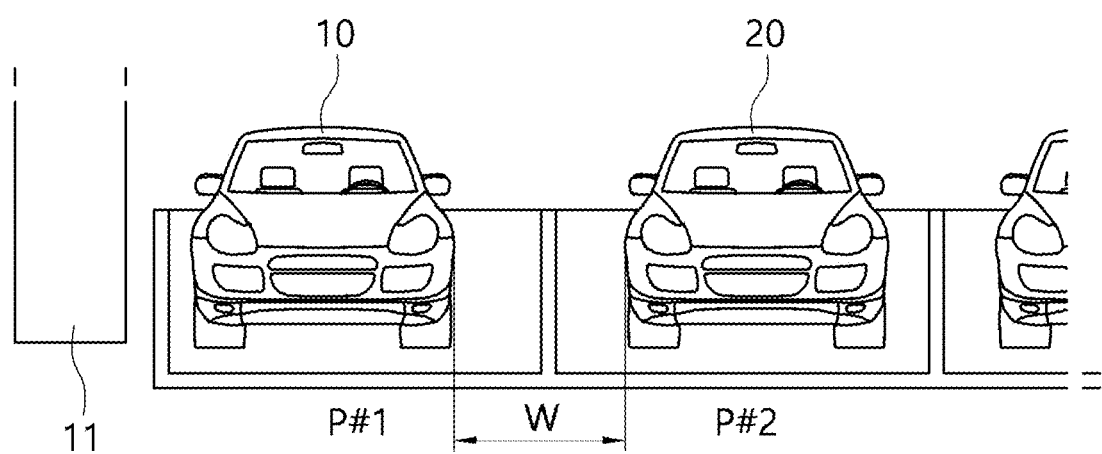
FIG. 2 is an exemplary view showing a state in which a vehicle equipped with an apparatus for controlling autonomous parking according to an exemplary embodiment of the present disclosure is parked according to a driver's tendency.

FIG. 1 is an exemplary view showing a state in which a vehicle equipped with an apparatus for controlling autonomous parking according to an exemplary embodiment of the present disclosure is parked, and FIG. 2 is an exemplary view showing a state in which a vehicle equipped with an apparatus for controlling autonomous parking according to an exemplary embodiment of the present disclosure is parked according to a driver's tendency.

Referring to FIG. 1, a vehicle 10 equipped with the apparatus for controlling autonomous parking 100 according to an exemplary embodiment of the present disclosure is often parked in proximity to a pillar 11 in the park spaces P #1 to P #3. As such, there are a number of orthogonal parking spaces, including underground parking lots of apartments and buildings. In addition, although the size of the parking spaces P #1 to P #3 is narrow, the size of recent vehicles is gradually increasing.

The gap with other vehicles 20 parked nearby is narrow, so problems such as difficulty in getting on and off or damage to other vehicles 20 parked next to each other, so-called door ding, often occur when opening and closing a door. Accordingly, as shown in FIG. 1, there are cases in which many drivers prefer to park in a parking space adjacent to the pillar 11, such as P #1 or P #3 in a parking space. At this time, the driver has a tendency to park the vehicle 10 close to the pillar in order to secure the convenience of getting on and off.

However, in the pillar parking environment as described above, since the conventional apparatus for controlling autonomous parking sets the center position as the parking target position with respect to the pillar 11 or the space between the pillar 11 and the parked vehicle, there is a case in which the tendency of the driver to park in proximity to the pillar 11 is not reflected.

In order to solve this problem, the apparatus for controlling autonomous parking 100 according to an exemplary embodiment of the present disclosure is to reflect the driver's tendency to control autonomous parking. In particular, the apparatus for controlling autonomous parking 100 may perform autonomous parking by setting an optimal parking target position according to the driver's tendency and the position of the pillar by controlling the parking interval in consideration of the opening and closing angle of the door according to the position of the pillar with respect to the lateral direction of the vehicle 10.

In addition, as shown in FIG. 2, when parking between the pillar 11 and the other vehicle 20, the driver has a tendency to park in close contact with the pillar 11 in order to secure the width W between the vehicle and the other vehicle 20 as large as possible.

In this case, it is possible to set the offset to be close to the pillar 11 to park the vehicle 10 in proximity to the pillar 11, but if a parking position is set to a predetermined target position, depending on the position of the pillar 11, interference occurs in the opening and closing amount of the door when getting on and off, thereby reducing the convenience of getting on and off.

To solve this, the apparatus for controlling autonomous parking 100 according to an exemplary embodiment of the present disclosure may detect the driver's tendency and various pillar parking environments, select an optimal parking position, and control autonomous parking based on this.

Here, the apparatus for controlling autonomous parking 100 may vary the final parking target position based on a predetermined value and a parking space search result by reflecting the driver's tendency and will. In this case, the apparatus for controlling autonomous parking 100 may adaptively set the final parking target position by adding a parking offset in addition to the reference parking target position reflecting the driver's tendency.

Figure 3:
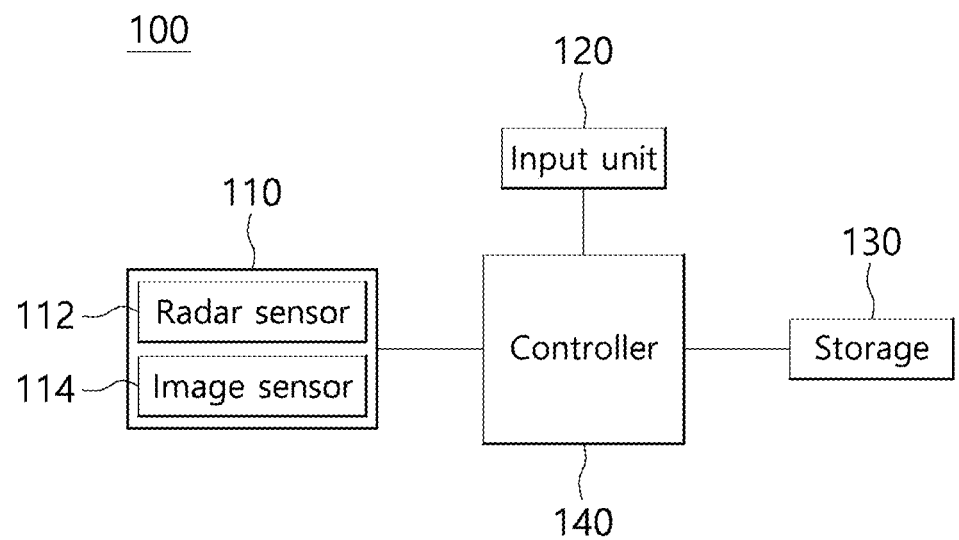
FIG. 3 is a block diagram of an apparatus for controlling autonomous parking according to an exemplary embodiment of the present disclosure.
Figure 4:
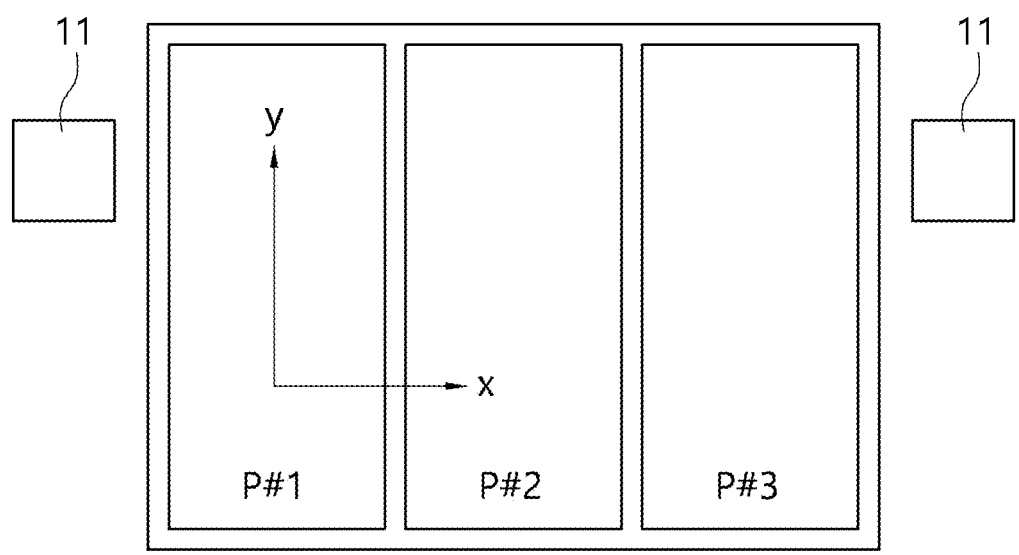
FIG. 4 is another exemplary view for explaining a parking target position of an apparatus for controlling autonomous parking according to an exemplary embodiment of the present disclosure.

FIG. 3 is a block diagram of an apparatus for controlling autonomous parking according to an exemplary embodiment of the present disclosure, and FIG. 4 is another exemplary view for explaining a parking target position of an apparatus for controlling autonomous parking according to an exemplary embodiment of the present disclosure.

Referring to FIG. 3, the apparatus for controlling autonomous parking 100 according to an exemplary embodiment of the present disclosure may include a sensor unit 110, an input unit 120, a storage 130, and a controller 140.

The sensor unit 110 may acquire information around a host vehicle 10. For example, the sensor unit 110 may include a radar sensor 112 and an image sensor 114.

The radar sensor 112 may be provided at the rear or side of the vehicle 10 to acquire information around the vehicle 10. For example, the radar sensor 112 may acquire a position and a distance to an object around the vehicle 10.

The image sensor 114 may be provided at the side and rear of the vehicle 10 to acquire images around the vehicle 10. For example, the image sensor 114 may include at least one of a camera sensor or a lidar sensor.

In the input unit 120, the driver's tendency information may be input by the driver. For example, the input unit 120 may be provided in a cluster of the vehicle 10 and may be a touch screen pad provided integrally with a display. In this case, the driver may input information through a keypad displayed on the touch screen pad.

As another example, the input unit 120 may be an external device communicating with the vehicle 10. In this case, the input unit 120 may be a portable terminal carried by the driver. Here, the portable terminal may be a smartphone or a smart pad. In this case, the portable terminal may be paired with the vehicle 10 through a communication unit.

The storage 130 may store driver's tendency information upon autonomous parking, input by the input unit 120. Here, the driver's tendency information may include information on at least one of whether a pillar is adjacent when parking next to the pillar, a minimum door opening and closing amount when a passenger gets on and off, and whether to use remote input/output when parking near a pillar.

Whether the pillar is adjacent indicates whether to park in close proximity to the pillar 11 when parking next to the pillar 11 or whether to park in general. Here, the general case means parking to be aligned in the center of the parking spaces P #1 to P #3.

The minimum door opening and closing amount when getting on and off means the degree of door opening. For example, the minimum door opening and closing amount when getting on and off may include 100% open full, partially open 75% or 50%, and the like.

Whether to use remote input/output when parking near a pillar indicates whether to park remotely after the driver or passenger gets off the vehicle 10.

The controller 140 may be communicatively connected to the sensor unit 110, the input unit 120, and the storage 130. Here, the controller 140 may be a part of an ECU (Electronic Control Unit) of the vehicle 10. Optionally, the controller 140 may be a controller to be equipped separately for autonomous parking.

The controller 140 may be configured to search for an available parking space based on the information around the vehicle 10 acquired by the sensor unit 110. For example, the controller 140 may search a space where a vehicle does not exist as an available parking space based on image information about the parking spaces P #1 to P #3. Here, the controller 140 may determine a parking target position based on the driver's tendency information among a plurality of available parking spaces.

For example, the controller 140 may be configured to set a parking target position based on the driver's tendency information when the passenger gets off after parking in the searched available parking space.

As shown in FIG. 4, the controller 140 may be configured to set a parking target position in consideration of the central alignment or standard separation distance between the vehicle 10 and the pillar or other vehicle with respect to the longitudinal direction (x-axis direction) of the vehicle 10.

At the same time, the controller 140 may set a parking target position so that the vehicle enters the standard length or more based on the parking line with respect to the lateral direction (y-axis direction) of the vehicle 10, or the wheel approaches a stopper if the stopper exists.

In this case, the controller 140 may be configured to search for a position of a pillar and a position of a stopper in the parking space, and search for seating information of a driver and fellow passengers. For example, the controller 140 may search for a position of a pillar and a position of a stopper in the parking space from the image and position information acquired by the sensor unit 110. In addition, the controller 140 may search for whether each seat is occupied by a pressure sensor (not shown) provided in each seat.

The controller 140 may be configured to determine whether the searched available parking space is next to a pillar 11. The controller 140 may be configured to perform general autonomous parking based on driver's tendency information if the searched available parking space is not next to the pillar 11.

In addition, if the searched available parking space is next to the pillar 11, the controller 140 may be configured to determine whether a passenger exists on the side of the pillar 11 when parking in the searched available parking space. For example, the controller 140 may determine whether a passenger exists on the side of the pillar 11 based on the position of the pillar 11 and the position of the passenger with respect to the vehicle 10.

The controller 140 may be configured to perform general autonomous parking based on driver' tendency information if there is no passenger on the side of the pillar 11 when parking in the searched available parking space.

In this case, the controller 140 may be configured to set a parking longitudinal offset so that the door and the side mirror of the vehicle 10 do not interfere with the pillar 11 according to the minimum door opening and closing amount of the driver's tendency if there is a passenger on the side of the pillar 11 when parking in the searched available parking space.

More specifically, the controller 140 may be configured to determine whether the door and the pillar 11 interfere with each other when the vehicle 10 is parked in an available parking space. For example, the controller 140 may be configured to determine the opening and closing amount of the door based on the distance between the door and the pillar 11. In addition, the controller 140 may determine whether the door and the pillar 11 interfere with each other according to the determined door opening and closing amount.

The controller 140 may be configured to set a door offset if the door and the pillar 11 interfere with each other when parking in an available parking space. For example, the controller 140 may set the parking door offset to the opposite side of the pillar 11 in the longitudinal direction of the vehicle 10 to increase the distance between the door and the pillar 11. At this time, the maximum value of the door offset should be set not to exceed a general parking target value. Here, the general parking target value means an edge position for a corresponding parking space.

In addition, the controller 140 may be configured to determine whether the side mirror and the pillar 11 interfere with each other when parking at the parking target position reflecting the door offset. For example, the controller 140 may be configured to determine the door opening and closing amount based on the distance between the side mirror and the pillar 11 at the parking target position reflecting the door offset. In addition, the controller 140 may determine whether the door and the pillar 11 interfere with each other according to the determined door opening and closing amount.

The controller 140 may be configured to set an additional longitudinal side mirror offset so that the side mirror and the pillar 11 do not interfere with each other if the side mirror and the pillar 11 interfere with each other when parking at a parking target position reflecting the door offset. For example, the controller 140 may set the parking side mirror offset to the opposite side of the pillar 11 in the longitudinal direction of the vehicle 10 to increase the distance between the side mirror and the pillar 11. At this time, the maximum value of the side mirror offset should be set not to exceed the general parking target value. Here, the general parking target value means an edge position for a corresponding parking space.

As such, the controller 140 may vary the final target parking position by setting an appropriate offset based on whether passengers including the driver are seated when parking in the parking space next to the pillar 11.

In addition, the controller 140 may be configured to set a parking target position reflecting the side mirror offset. For example, the controller 140 may adjust the parking reference line to the opposite side of the pillar 11 by the longitudinal door offset and the side mirror offset at the parking target position reflecting the driver's tendency.

Accordingly, the apparatus for controlling autonomous parking 100 according to an exemplary embodiment of the present disclosure can prevent interference between the door and the side mirror and the pillar when passengers are getting on and off, so that the driver's convenience can be improved. In addition, the apparatus for controlling autonomous parking 100 according to an exemplary embodiment of the present disclosure can prevent damage to the door and the side mirror, thereby suppressing economic loss or time loss.

In addition, the controller 140 may be configured to perform autonomous parking by varying the parking target position according to the parking offset set as described above.

In this case, the controller 140 may be configured to reset the parking offset if the driver selects to perform remote entry/exit of the vehicle 10. For example, the controller 140 may reset the parking offset stored in the storage 130.

Hereinafter, a method for controlling autonomous parking of the present disclosure will be described with reference to FIGS. 5 and 6.

Figure 5:
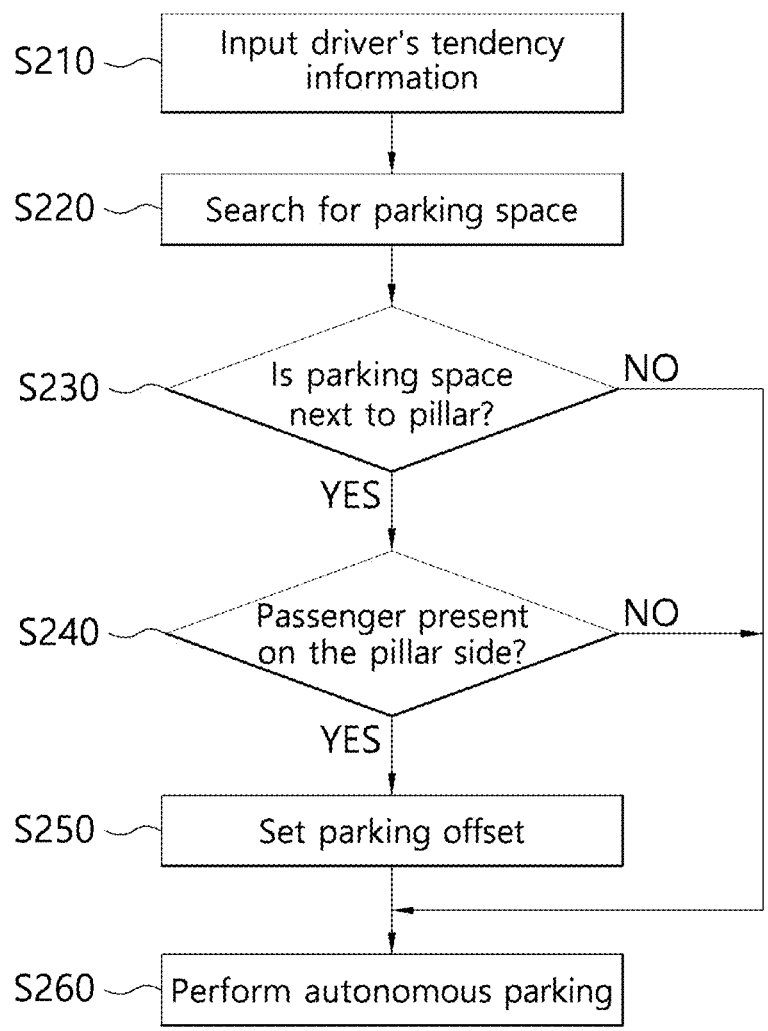
FIG. 5 is a flowchart of a method for controlling autonomous parking according to an exemplary embodiment of the present disclosure.

FIG. 5 is a flowchart of a method for controlling autonomous parking according to an exemplary embodiment of the present disclosure.

The method for controlling autonomous parking 200 may include inputting driver's tendency information at step S210, searching for a parking space at step S220, setting a parking offset according to the position of a pillar and the presence or absence of a passenger at steps S230 to S250, and performing autonomous parking by reflecting the parking offset at step S260.

More specifically, as shown in FIG. 5, first, the apparatus for controlling autonomous parking 100 receives input of driver's tendency information upon autonomous parking at step S210. In this case, the apparatus for controlling autonomous parking 100 may receive input of information on at least one of whether a pillar is adjacent when parking next to the pillar, a minimum door opening and closing amount when a passenger gets on and off, and whether to use remote input/output when parking near a pillar.

Next, the apparatus for controlling autonomous parking 100 searches for an available parking space based on information around a host vehicle 10 acquired by the sensor unit 110 at step S220. In this case, the apparatus for controlling autonomous parking 100 may search a space where a vehicle does not exist as an available parking space based on image information about the parking spaces P #1 to P #3.

In addition, the apparatus for controlling autonomous parking 100 may set a parking target position based on the driver's tendency information when the passenger gets off after parking in the searched available parking space.

For example, the apparatus for controlling autonomous parking 100 may set a parking target position in consideration of the central alignment or standard separation distance between the vehicle 10 and the pillar or other vehicle with respect to the longitudinal direction (x-axis direction) of the vehicle 10.

At the same time, the apparatus for controlling autonomous parking 100 may set a parking target position so that the vehicle enters the standard length or more based on the parking line with respect to the lateral direction (y-axis direction) of the vehicle 10, or the wheel approaches a stopper if the stopper exists.

In addition, the apparatus for controlling autonomous parking 100 may search for a position of a pillar and a position of a stopper in the parking space, and search for seating information of a driver and fellow passengers. For example, the apparatus for controlling autonomous parking 100 may search for a position of a pillar and a position of a stopper in the parking space from the image and position information acquired by the sensor unit 110. In addition, the apparatus for controlling autonomous parking 100 may search for whether each seat is occupied by a pressure sensor (not shown) provided in each seat.

Next, the apparatus for controlling autonomous parking 100 determines whether the searched available parking space is next to a pillar 11 at step S230, and if the searched available parking space is not next to the pillar 11, proceeds to step S260, and may perform general autonomous parking based on driver' tendency information.

As a result of the determination at step S230, if the searched parking space is next to the pillar 11, the apparatus for controlling autonomous parking 100 determine whether a passenger exists on the side of the pillar 11 when parking in the searched available parking space at step S240. For example, the apparatus for controlling autonomous parking 100 may determine whether a passenger exists on the side of the pillar 11 based on the position of the pillar 11 and the position of the passenger with respect to the vehicle 10.

As a result of the determination at step S240, if there is no passenger on the side of the pillar 11 when parking in the searched available parking space, the apparatus for controlling autonomous parking 100 proceeds to step S260 and may perform general autonomous parking based on driver' tendency information.

As a result of the determination at step S240, if there is no passenger on the side of the pillar 11 when parking in the searched available parking space, the apparatus for controlling autonomous parking 100 set a parking longitudinal offset so that the door and the side mirror of the vehicle 10 do not interfere with the pillar 11 according to the minimum door opening and closing amount of the driver's tendency at step S250. A detailed description will be described later with reference to FIG. 6.

Next, the apparatus for controlling autonomous parking 100 performs autonomous parking by varying the parking target position according to the offset set at step S250 at step S260. In this case, the apparatus for controlling autonomous parking 100 may reset the parking offset if the driver selects to perform remote entry/exit of the vehicle 10.

Figure 6:
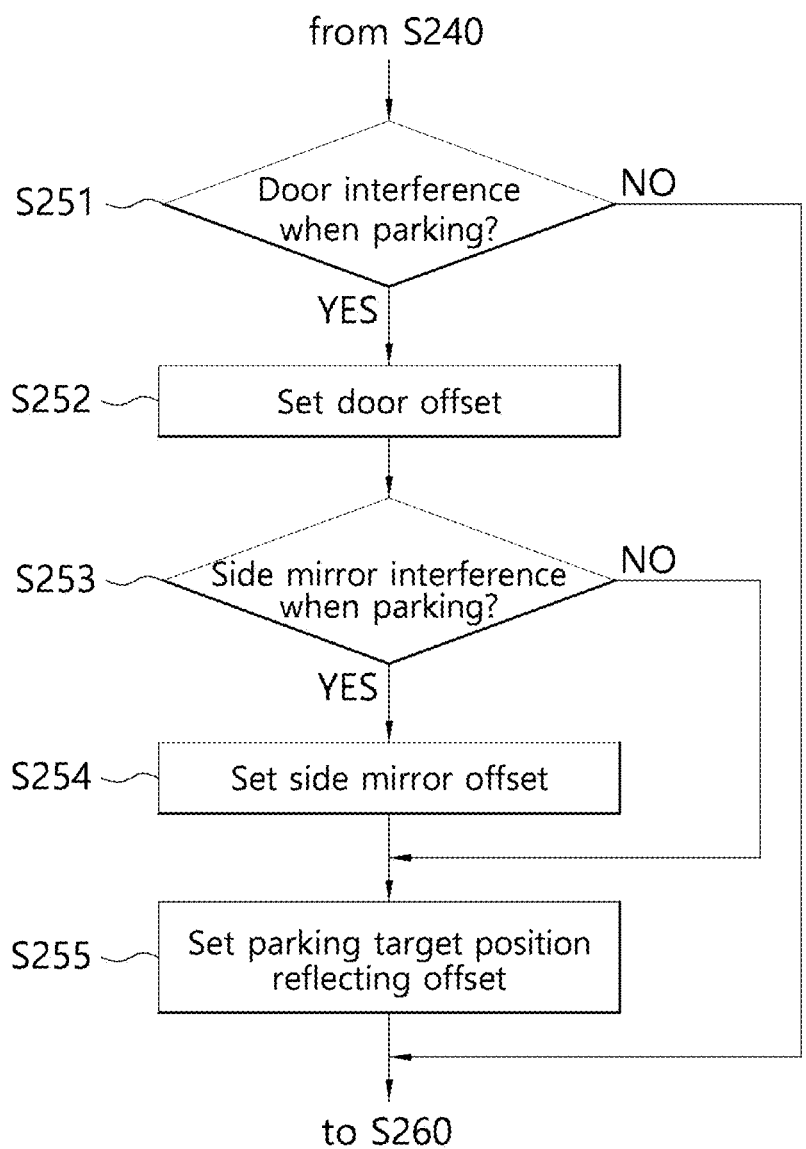
FIG. 6 is a flowchart showing a procedure for setting a parking offset in a method for controlling autonomous parking according to an exemplary embodiment of the present disclosure.

FIG. 6 is a flowchart showing a procedure for setting a parking offset in a method for controlling autonomous parking according to an exemplary embodiment of the present disclosure.

The procedure 250 for setting a parking offset may include setting a door offset when parking at steps S251 and S252, setting a side mirror offset at steps S253 and S254, and setting a parking target position by reflecting the offset at step S255.

More specifically, as shown in FIG. 6, first, the apparatus for controlling autonomous parking 100 determines whether the door and the pillar 11 interfere with each other when parking in an available parking space at step S251. In this case, the apparatus for controlling autonomous parking 100 may determine the opening and closing amount of the door based on the distance between the door and the pillar 11. In addition, the apparatus for controlling autonomous parking 100 may determine whether the door and the pillar 11 interfere with each other according to the determined door opening and closing amount.

As a result of the determination at step S251, if the door and the pillar 11 do not interfere with each other when parking in the available parking space, a series of parking offset setting is terminated and the procedure proceeds to step S260.

As a result of the determination at step S251, if the door and the pillar 11 interfere with each other when parking in the available parking space, the apparatus for controlling autonomous parking 100 sets the door offset so that the door and the pillar 11 do not interfere with each other at step S252. For example, the apparatus for controlling autonomous parking 100 may set the parking door offset to the opposite side of the pillar 11 in the longitudinal direction of the vehicle 10 to increase the distance between the door and the pillar 11. At this time, the maximum value of the door offset should be set not to exceed a general parking target value. Here, the general parking target value means an edge position for a corresponding parking space.

Next, the apparatus for controlling autonomous parking 100 determines whether the side mirror and the pillar 11 interfere with each other when parking at the parking target position reflecting the door offset at step S253. For example, the apparatus for controlling autonomous parking 100 may determine the door opening and closing amount based on the distance between the side mirror and the pillar 11 at the parking target position reflecting the door offset. In addition, the apparatus for controlling autonomous parking 100 may determine whether the door and the pillar 11 interfere with each other according to the determined door opening and closing amount.

As a result of the determination at step S253, if the side mirror and the pillar 11 do not interfere with each other when parking at a parking target position reflecting the door offset, the apparatus for controlling autonomous parking 100 may proceed to step S255 to set the target position by applying only the door offset.

As a result of the determination at step S253, if the side mirror and the pillar 11 interfere with each other when parking at a parking target position reflecting the door offset, the apparatus for controlling autonomous parking 100 sets an additional longitudinal side mirror offset so that the side mirror and the pillar 11 do not interfere with each other at step S254. For example, the apparatus for controlling autonomous parking 100 may set the parking side mirror offset to the opposite side of the pillar 11 in the longitudinal direction of the vehicle 10 to increase the distance between the side mirror and the pillar 11. At this time, the maximum value of the side mirror offset should be set not to exceed the general parking target value. Here, the general parking target value means an edge position for a corresponding parking space.

Next, the apparatus for controlling autonomous parking 100 sets a parking target position reflecting the side mirror offset at step S255. For example, the apparatus for controlling autonomous parking 100 may adjust the parking reference line to the opposite side of the pillar 11 by the longitudinal door offset and the side mirror offset at the parking target position reflecting the driver's tendency.

Such methods may be implemented by the apparatus for controlling autonomous parking 100 as shown in FIG. 3, and in particular, may be implemented as a software program that performs such steps, wherein such program may be stored on a computer-readable recording medium or transmitted by a computer data signal combined with a carrier wave in a transmission medium or a communication network. In this case, the computer-readable recording medium may include any kind of recording device in which data readable by a computer system is stored.

Although exemplary embodiments of the present disclosure have been described above, the spirit of the present disclosure is not limited to the embodiments set forth herein. Those of ordinary skill in the art who understand the spirit of the present disclosure may easily propose other embodiments through supplement, change, removal, addition, etc. of elements within the same spirit, but the embodiments will be also within the scope of the present disclosure.

<Description of Symbols>

| | |
|---|---|
| 100: apparatus for controlling autonomous parking | |
| 110: sensor unit | 112: radar sensor |
| 114: image sensor | 120: input unit |
| 130: storage | 140: controller |
| 10: vehicle | 11: pillar |
| 20: other vehicle | P#1~P#3: parking space |

What is claimed is:

1. An apparatus for controlling autonomous parking, comprising:
    a sensor unit configured to acquire information around a host vehicle;
    a storage configured to store driver's tendency information upon autonomous parking; and
    a controller communicatively connected to the sensor unit and the storage, the controller configured to:
        search for an available parking space based on the acquired information around the vehicle;
        determine whether the available parking space is next to an object;
        determine whether a passenger is on a seat adjacent to the object in the vehicle assuming that the vehicle is parked at the available parking space next to the object;
        when the available parking space is next to the object and the passenger is on the seat adjacent to the object in the vehicle, set a parking target position based on the driver's tendency information, set a parking longitudinal offset so that a door or a side mirror of the vehicle does not interfere with the object, and perform the autonomous parking by varying the parking target position according to the set parking longitudinal offset,
        wherein the controller is configured to reset the offset if the driver selects to perform remote entry or exit of the vehicle.

2. The apparatus for controlling autonomous parking of claim 1, further comprising an input unit to which the driver's tendency information is input,
    wherein the driver's tendency information comprises information on at least one of whether the object is adjacent when parking next to the object, a minimum door opening and closing amount when the passenger gets on and off, and whether to use remote input/output when parking near the object.

3. The apparatus for controlling autonomous parking of claim 2, wherein the minimum door opening and closing amount when getting on and off is a degree of door opening and the minimum door opening and closing amount when getting on and off comprises 100%, 75% or 50% door opening and closing.

4. The apparatus for controlling autonomous parking of claim 1, wherein the controller is configured to search for a position of the object and a position of a stopper in the parking space, and search for seating information of a driver and fellow passengers.

5. The apparatus for controlling autonomous parking of claim 1, wherein the controller is configured to set the parking target position in consideration of the central alignment between the vehicle and the object or other vehicle with respect to the longitudinal direction of the vehicle so that the vehicle enters a standard length or more based on a parking line with respect to the lateral direction of the vehicle, or a wheel approaches a stopper if the stopper exists.

6. The apparatus for controlling autonomous parking of claim 1, wherein the controller is configured to set the parking target position in consideration of a standard separation distance between the vehicle and the object or other vehicle with respect to the longitudinal direction of the vehicle so that the vehicle enters a standard length or more based on a parking line with respect to the lateral direction of the vehicle, or a wheel approaches a stopper if the stopper exists.

7. The apparatus for controlling autonomous parking of claim 1, wherein the controller is configured to:
- set a door offset if the door and the object interfere with each other when parking in the available parking space,
- set a longitudinal side mirror offset if the side mirror and the object interfere with each other when parking at a parking target position reflecting the door offset, and
- set a parking target position reflecting the longitudinal side mirror offset.

8. The apparatus for controlling autonomous parking of claim 1, wherein the sensor unit comprises:
- a radar sensor configured to acquire a position and a distance to an object around the vehicle; and
- an image sensor configured to acquire images around the vehicle.

9. The apparatus for controlling autonomous parking of claim 1, wherein the controller comprises an ECU of the vehicle or a controller separately equipped for autonomous parking.

10. A method for controlling autonomous parking, comprising:
- inputting driver's tendency information upon autonomous parking;
- searching for, by a controller, an available parking space based on information around a host vehicle acquired by a sensor unit;
- determining, by the controller, whether the available parking space is next to an object;
- determining, by the controller, whether a passenger is on a seat adjacent to the object in the vehicle assuming that the vehicle is parked at the available parking space next to the object;
- when the available parking space is next to the object and the passenger is on the seat adjacent to the object in the vehicle, setting, by the controller, a parking target position based on the driver's tendency information, setting, by the controller, a parking longitudinal offset so that a door or a side mirror of the vehicle does not interfere with the object, and performing, by the controller, autonomous parking by varying the parking target position according to the set parking longitudinal offset set,
- wherein the performing of the autonomous parking comprises resetting the offset if the driver selects to perform remote entry or exit of the vehicle.

11. The method for controlling autonomous parking of claim 10,
- wherein the inputting of the driver's tendency information comprises inputting information on at least one of whether the object is adjacent when parking next to the object, a minimum door opening and closing amount when the passenger gets on and off, and whether to use remote input/output when parking near the object.

12. The method for controlling autonomous parking of claim 11, wherein the minimum door opening and closing amount when getting on and off is a degree of door opening and the minimum door opening and closing amount when getting on and off comprises 100%, 75% or 50% door opening and closing.

13. The method for controlling autonomous parking of claim 10, wherein the searching for the available parking space comprises searching for a position of the object and a position of a stopper in the parking space, and searching for seating information of a driver and fellow passengers.

14. The method for controlling autonomous parking of claim 10, wherein the setting of the parking target position comprises setting the parking target position in consideration of the central alignment between the vehicle and the object or other vehicle with respect to the longitudinal direction of the vehicle so that the vehicle enters a standard length or more based on a parking line with respect to the lateral direction of the vehicle, or a wheel approaches a stopper if the stopper exists.

15. The method for controlling autonomous parking of claim 10, wherein the setting of the parking target position comprises setting the parking target position in consideration of a standard separation distance between the vehicle and the object or other vehicle with respect to the longitudinal direction of the vehicle so that the vehicle enters a standard length or more based on a parking line with respect to the lateral direction of the vehicle or a wheel approaches a stopper if the stopper exists.

16. The method for controlling autonomous parking of claim 10, wherein the setting of the parking longitudinal offset comprises:
- setting a door offset so that the door or the object does not interfere with each other if the door and the pillar interfere with each other when parking in the available parking space;
- setting a longitudinal side mirror offset so that the side mirror or the object does not interfere with each other if the side mirror and the pillar interfere with each other when parking at a parking target position reflecting the door offset; and
- setting a parking target position reflecting the longitudinal side mirror offset.

* * * * *